Oct. 17, 1967    H. C. RONALDS    3,347,151
INFUSER AND CONTAINER FOR INFUSION PRODUCTS
Filed Nov. 22, 1965
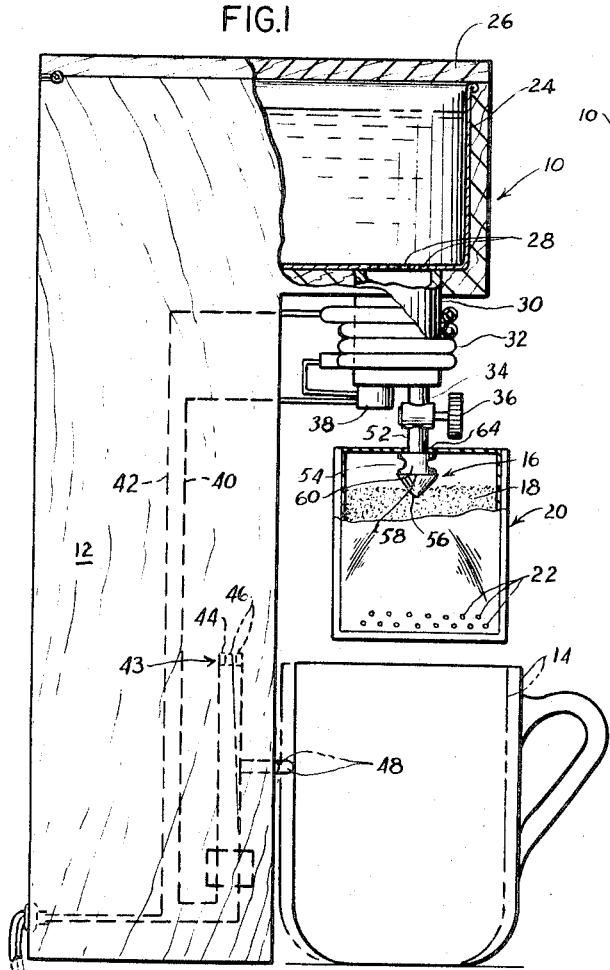
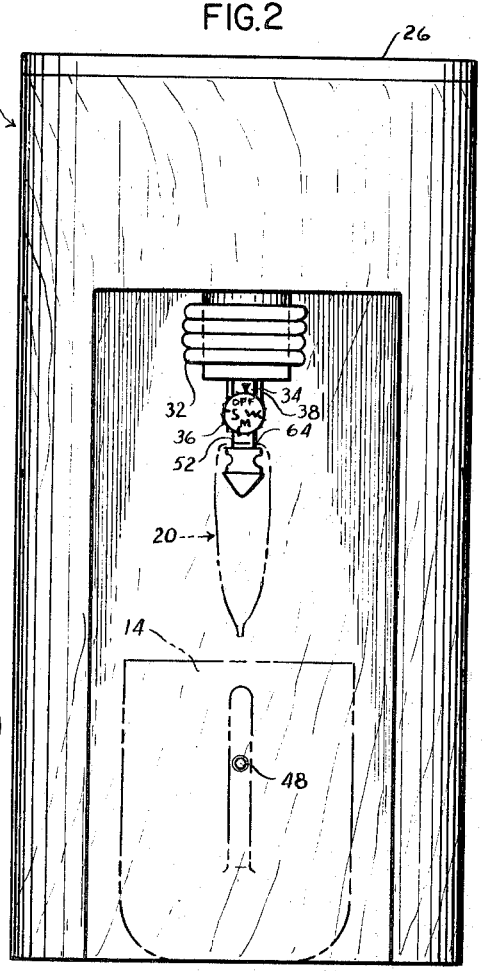
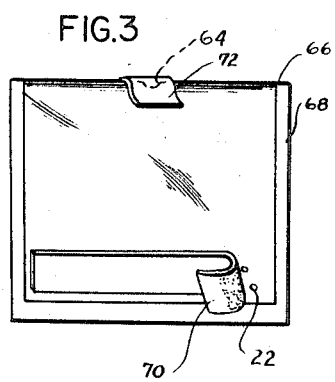
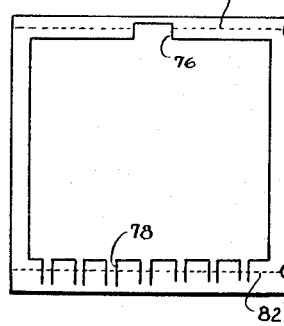
INVENTOR.
HUGH C. RONALDS
BY
ATTORNEYS

United States Patent Office 3,347,151
Patented Oct. 17, 1967

3,347,151
INFUSER AND CONTAINER FOR
INFUSION PRODUCTS
Hugh C. Ronalds, 209 Katherine Road,
Ridgewood, N.J. 07450
Filed Nov. 22, 1965, Ser. No. 508,932
9 Claims. (Cl. 99—295)

This invention relates to the making of coffee and, more particularly, relates to improved equipment and disposable containers for making a single cup of coffee.

Throughout the years, there has been developed many different arrangements for brewing of coffee as, for example, the well known percolator and drip type coffee pots. However, it has been found that there is a need for apparatus and/or methods of brewing a single cup of coffee at one time. When so doing, conventional equipment has several drawbacks, among which is the time consuming and unpleasant task of cleaning the components of the pot used and disposal of the waste grounds.

The time involved and the inconvenience are factors giving rise to the current popularity of so-called "instant" or dissolvable coffee products. Unfortunately, the preparation of dissolvable coffee products has certain technical problems, such as the required removal of aromatic oil from the powder, and the coffee made from such powders has a different taste from the coffee made from infusion of ground coffee by hot water.

For this reason, much attention has been given by the art to preparation of single cups of coffee as a hot water extraction of ground coffee.

The problem of brewing single cups of coffee from ground coffee beans has, of course, been encountered in the field of coin-operated coffee dispensers. In such dispensers, various equipments have been developed to measure out a unit of ground coffee and to provide means for infusion of the ground coffee with hot water for a time sufficiently long to develop an infusion product of desired strength. Because of the quantity of coffee dispensed by these equipments, however, various and usually quite complicated mechanical structures have been employed which are justified by the dispenser volume. However, the cost of such units precludes use of such units as, for example, in the home or the office by an individual.

It is, therefore, a primary object of the present invention to provide an improved unit container for a measured quantity of ground coffee and an improved infuser with which the unit container cooperates to dispense a single cup of a coffee infusion.

In accordance with this object, there is provided, in a preferred embodiment of this invention, a container holding a pre-measured quantity of ground coffee which is sufficient to provide a single cup of a coffee extraction when hot water is flowed therethrough. The package is preferably constructed of material functioning as a vapor barrier to maintain the coffee grounds fresh until actual use. The material must be capable of holding hot water without deterioration. The container is provided with a circular entrance hole and a plurality of smaller exit holes at opposite ends thereof. Means are provided to maintain the entrance and exit holes sealed until time of use.

The infuser comprises a generally vertically extending frame having provision at the base thereof for receipt of a coffee cup. A water storage compartment is provided at the top of the infuser. Holes are provided to allow the water from the water storage compartment to flow downwardly through a heating element where the water is heated to just below the boiling point. The heated water is then passed through a valved opening into an exit spout. Switch means are provided at the base of the infuser which is tripped by the insertion of a cup therein so as to preclude heating of the water unless a cup is positioned below the exit spout. Thermostatic controls of the water temperature in the heating chamber may be provided to prevent boiling of the water. The exit spout consists of a generally cylindrical duct having water exit apertures pierced into the side walls at opposed locations. The end of the duct is sealed by a conical tip. The conical tip is positioned with the base thereof in sealing engagement with the duct and having a diameter larger than that of the duct to provide a shoulder. A resilient gasket is seated against the shoulder and is provided with apertures matching the apertures in the duct. The conical tip is constructed of hard material such as metal.

In operation, the seals on the package are opened. The entrance aperture is then slipped over the conical tip of the exit spout of the infuser and up over the resilient sealing gasket on top of the conical tip. The entrance aperture is slightly smaller than the base diameter of the conical tip. As the container is inserted, the material stretches slightly to pass the tip. The material then contracts over the top of the gasket to hold the container in place. The exit holes in the unitary container are also opened. The unit may then be plugged in, a cup of water poured into the storage container and the same cup inserted below the container held on the infuser. The valve is then opened to the desired strength since a slow flow will result in a stronger cup of coffee than a fast flow. The water flows through the heating element and is heated to the desired infusion temperature which is maintained just below the boiling point to prevent extraction of bitter components from the coffee. The heated water than flows through the exit spout of the infuser and into the coffee grounds held within the unit container suspended from the spout thereof. The water percolates downwardly through the ground coffee infusing the same and flows outwardly through the exit holes of the container into the cup as the desired coffee extraction. The container may then be merely pulled from the spout by the user and discarded.

In this manner, it can be seen that brewing a single cup of coffee can be accomplished in an expeditious and convenient fashion with disposal of the waste grounds facilitated and cleaning of the unit reduced to mere rinsing.

The package itself must, of course, be made of material which will not dissolve under the action of the hot water and which will provide a vapor-proof seal to maintain freshness of the package during storage. Additionally, it is desirable that the material be slightly stretchable. The entrance hole pierced therein is then made slightly smaller than the base diameter of the tap so that as the container is inserted onto the discharge spout of the infuser, it will stretch slightly and reset over the resilient gasket. This provides quite adequate sealing in quite simple and expedient manner.

Having briefly described this invention, it will be described in greater detail along with other objects and advantages in the following portions of the specification, which may best be understood by reference to the accompanying drawings, in which:

FIG. 1 is a partially sectioned side elevation view of the infuser and container in accordance with the present invention;

FIG. 2 is a front elevation of the infuser and container of FIG. 1;

FIG. 3 is a plan view of the container used in FIGS. 1 and 2;

FIG. 4 is a plan view of another embodiment of a container; and

FIG. 5 is a plan view of still another embodiment of a container.

In FIGS. 1 and 2, there is shown an infuser 10 consisting of a generally vertically extending housing 12 provided with space at the base thereof to receive a coffee cup 14. When so positioned, the cup 14 is in position to receive the infusion product caused by the water flow from nozzle 16 after percolating downwardly through the coffee grounds 18 in the container 20 and exiting from the container through the exit holes 22 provided therein. The water is initially stored in a chamber 24 which may be enclosed by a lid 26. The chamber 24 is provided with discharge orifices 28 in the bottom thereof to permit the water to flow therefrom at a predetermined discharge rate and to inhibit, but not block, convection flow of hot water from the heating chamber 30 back into the unheated chamber 24. The water flowing through the holes 28 is ducted into a heating chamber 30. The heating chamber 30 is of the flash heater type having a heating element 32 provided thereon. The heating element 32 is electrically energized and should be of sufficient capacity to heat the water flowing therethrough just below the boiling point of water under conditions of maximum water flow. The water is passed from the heating chamber through a discharge duct 34 provided with a valve 36 for control of the discharge rate. In order to prevent boiling of the water under lower discharge rates which would result in extraction of bitter components from the ground coffee, a thermostat 38 may be coupled to the heating chamber and serially coupled with the power leads 40 and 42 so as to cut off the flow of heating current to the heating coils when the temperature rises above the predetermined temperature. Similarly, to prevent discharge of hot water in the absence of a receiving cup 14, there is provided a switch 43 consisting of contacts 44, 46 energized by plunger 48. Thus, in the absence of a cup, or when the cup 14 is not properly positioned, the switch 43 will open, breaking the supply of power to the heating element.

The infuser nozzle consists of a cylindrical duct 52 having vents 54 pierced in the side wall thereof at opposed locations. Although a plurality of apertures may be used, I have found that the infuser works quite adequately with two apertures 1/16 of an inch in diameter in a 1/4 inch tubing. The end of the tubing is sealed by a conical tip 56, the base of which is larger in diameter than the duct 52 to provide a shoulder 58. A resilient sealing ring 60 surrounds the tube and is located against the shoulder 58. The resilient seal 60 is provided with apertures coincident with the apertures in the duct.

The container is provided with an entrance aperture 64 of circular configuration and of slightly smaller diameter than the base of the tip and the diameter of the sealing ring 60. Thus, as the container is inserted over the discharge nozzle, the material is stretched slightly and when it passes the resilient seal will return to its original position, cooperating with the resilient seal to hold the container on the nozzle without mechanical augmentation. After extraction of the infusion product, the container 20 enclosing the waste coffee grounds is merely removed from the nozzle and disposed of as an entity.

The container may be constructed as is more specifically shown in FIG. 3. The container may be formed by folding heat sealable plastic such as a polyester along the top 66 to enclose a measured quantity of ground coffee. The edges may then be heat sealed together along the marginal portions 68 thereof to enclose the coffee. The entrance hole 64 is usually prepunched in the container blank. Similarly, the container is provided with a plurality of discharge or exit holes 22 for passage of the extraction product therefrom. These holes 22 are usually more easily inserted in the container blank before folding. In order to provide a container which will maintain the ground coffee in fresh condition, the entrance and exit holes are sealed by the application of adhesive tabs 70 and 72 across the exit and entrance holes respectively. These tabs may easily be removed by the user at the point of use. The container is preferably made of plastic material since plastic such as the polyester types of plastic are both heat sealable and provide the desired vapor barrier protecting the ground coffee from exposure to the atmosphere. For example, I have found the heat sealable polyester manufactured by 3M, Inc. under the trade designation Scotchpak satisfactory. Films of this nature are, of course, utilized for containers in which food products are packaged and cooked in the package. Thus, they are perfectly satisfactory for exposure to hot water. Films of 5 mil thickness are quite adequate to provide the desired resistance, vapor barrier and mechanical strength. The small exit holes 22 will normally restrain the coffee grounds in satisfactory manner. Of course, filter paper may be applied over the holes interiorly of the container for more exacting straining but at higher cost.

Alternatively, the container shown in FIG. 4 may be utilized in which the container is formed of mating halves of the heat sealable plastic. The container is heat sealed around the entire periphery 74. A portion 76 for the entrance hole is provided in the top margin and portions 78 are provided in the bottom margin which are not heat sealed. A row of perforations 80 and 82 are provided respectively in the top and bottom margins. The user then merely tears the strips off the top and bottom as defined by the perforations 80 and 82 respectively which will expose the entrance hole and the exit holes.

Alternatively, as shown in FIG. 5, porous paper products suitable for exposure to hot water may be utilized to form the body of the container. Such porous paper products are commonly used as filters and in packaging. In such case, the container need not be provided with exit holes since the infusion products can pass directly through the body. However, the remainder of the body 82 is preferably coated with a plastic coating 84 to provide a vapor barrier for product freshness and as a seal for margins 86. The bottom portion is sealed with an adhesive tab 88 to seal the container for product freshness during storage. When the user wants to use the container, he merely removes the tab 88 and the tab 72 over the entrance hole to ready the container for use.

Although the specification has used coffee as the selected illustrative product, other infusion products such as soups and the like may be enclosed in the container. Similarly, when coffee is used, sugar and dehydrated dairy products may be included with the ground coffee when desired by the user.

This invention may be variously modified and embodied within the scope of the subjoined claims.

What is claimed is:

1. An infuser comprising a water holding chamber, an exit nozzle communicating with said water holding chamber, means for heating said water before said water exits from said exit nozzle, said nozzle comprising a tubular portion, the end of said tubular portion being sealed by the base of a conical tip, the base diameter of said conical tip exceeding the diameter of said tube to provide a shoulder, and a unitary container, said container being provided with an entrance hole adapted to encircle said nozzle in engaged relationship with said shoulder, said nozzle being provided with orifices for water flow therethrough, said container being provided with exit orifices for escape of said water after percolating downwardly through the contents of said container.

2. An infuser according to claim 1 which includes a resilient seal positioned against said shoulder and in which said entrance hole encircles said nozzle and engages said resilient seal in supported relationship.

3. An infuser according to claim 1 which includes a heating chamber positioned beneath said water holding chamber and communicating with both said water holding chamber and said exit nozzle.

4. An infuser in accordance with claim 3 in which said heating chamber is provided with electrical heating coils and which includes a serially coupled thermostatically controlled switch and a mechanically energized switch to close the circuit only when a receptacle is inserted within said infuser and when the temperature of the water in said heating chamber is below the boiling point.

5. An infuser in accordance with claim 1 which includes valve means in said nozzle to control the flow of water therethrough.

6. An infuser in accordance with claim 1 in which said container comprises a body portion formed of heat sealable polyester plastic enclosing the contents of said container, an entrance hole pierced in one edge of said container and being of slightly less diameter than the base of said conical tip, and a plurality of exit holes pierced in the opposed edge portions of said container.

7. An infuser in accordance with claim 6 which includes tabs adhesively secured to said container for sealing of said container prior to use.

8. An infuser in accordance with claim 1 in which said container comprises a body portion formed of heat sealable plastic material heat sealed around the periphery thereof, a weakened strip formed in one edge of said heat sealed periphery, a portion of said edge material extending beyond said perforations remaining unsealed so that as said margin is torn along the weakened portion, an entrance hole will be defined in said edge, and the opposed edge of said container also having a weakened marginal portion, a plurality of narrow portions extending beyond said weakened portion being unsealed so that as said marginal portion is torn along said weakened line, a plurality of exit holes will be defined in the edge thereof.

9. An infuser in accordance with claim 1 in which said container is formed of a porous material sealed together at the peripheral portions thereof, an entrance hole formed in one edge, and a plastic coating applied over said paper to render said paper a vapor barrier along the top portion of the body, the portion of the paper which is not coated with plastic being covered by a removable tab portion.

References Cited

UNITED STATES PATENTS

| | | | |
|---|---|---|---|
| 2,522,558 | 9/1950 | Alvarez | 99—281 |
| 2,835,782 | 5/1958 | Stiebel | 99—281 X |
| 2,839,988 | 6/1958 | Tritt | 99—282 X |
| 2,926,234 | 2/1960 | Palmer | 99—281 X |
| 3,062,126 | 11/1962 | Wolf | 99—281 X |
| 3,179,035 | 4/1965 | Lockett | 99—282 |

WALTER A. SCHEEL, *Primary Examiner.*

R. JENKINS, *Assistant Examiner.*